(12) United States Patent
Dang

(10) Patent No.: US 11,304,563 B2
(45) Date of Patent: Apr. 19, 2022

(54) CHIMNEY STARTER

(71) Applicant: Hoang Dang, Mansfield, TX (US)

(72) Inventor: Hoang Dang, Mansfield, TX (US)

(*) Notice: Subject to any disclaimer, the term of this patent is extended or adjusted under 35 U.S.C. 154(b) by 350 days.

(21) Appl. No.: 16/680,326

(22) Filed: Nov. 11, 2019

(65) Prior Publication Data

US 2021/0137312 A1 May 13, 2021

(51) Int. Cl.
*A47J 37/07* (2006.01)
(52) U.S. Cl.
CPC .................. *A47J 37/079* (2013.01)
(58) Field of Classification Search
CPC .................................................. A47J 37/079
See application file for complete search history.

(56) References Cited

U.S. PATENT DOCUMENTS

| | | | | |
|---|---|---|---|---|
| 4,574,711 A * | 3/1986 | Christian | ................ | F23M 9/06 110/264 |
| 4,836,115 A * | 6/1989 | MacArthur | ............... | F23B 1/36 110/118 |
| 6,318,356 B1 * | 11/2001 | Stephen | ............... | A47J 37/0786 126/242 |
| 7,866,311 B2 * | 1/2011 | Warner | ................ | A47J 37/079 126/25 B |
| 8,662,067 B2 * | 3/2014 | Warner | ..................... | F23Q 7/02 126/25 B |
| 9,291,349 B2 * | 3/2016 | Warner | ................... | F24B 1/182 |
| 2003/0194671 A1 * | 10/2003 | Webb | ..................... | F23C 3/006 431/159 |
| 2008/0230044 A1 * | 9/2008 | Warner | ................. | A47J 37/079 126/25 B |
| 2009/0025574 A1 * | 1/2009 | Byrnes | ................ | A47J 37/0786 99/447 |
| 2011/0168157 A1 * | 7/2011 | Warner | ..................... | F23Q 7/02 126/25 B |
| 2012/0192852 A1 * | 8/2012 | Whitmire | ............... | F24B 15/005 126/25 B |
| 2014/0299119 A1 * | 10/2014 | Warner | ................... | F24B 1/022 126/25 B |

* cited by examiner

*Primary Examiner* — Edelmira Bosques
*Assistant Examiner* — Deepak A Deean
(74) *Attorney, Agent, or Firm* — Christopher Pilling

(57) ABSTRACT

An improved chimney starter having a cylindrical housing having an outer wall and inner wall defining a chamber, the chamber configured to hold charcoal. A series of spiral heat exchange chambers contained within the cylindrical housing and an air intake port provided on a portion of the cylindrical housing, wherein the air intake port is connected to the series of spiral heat exchange chambers. A base configured to retain a fire starter configured to ignite and burn the charcoal. Advantageously, a fan blower is configured to be positioned in the air intake port such that blown air is configured to be directed through the series of spiral heat exchange chambers, wherein the directed air accelerates the burning of the charcoal.

8 Claims, 7 Drawing Sheets

CHIMNEY STARTER

CROSS-REFERENCE TO RELATED APPLICATIONS

N/A

BACKGROUND OF THE INVENTION

1. Field of the Invention

The present invention generally relates to igniting charcoal and more particularly to an improved chimney starter.

2. Description of Related Art

Chimney starters, also called charcoal chimneys, are devices used to ignite charcoal, such as lump charcoal or charcoal briquettes. Typically, a chimney starter is filled with charcoal, then paper or other fuel is placed below the charcoal. The charcoal and ignition source is usually separated by a grate. The ignition source is configured to ignite the charcoal, and then once all the charcoal is burning, some or all of the charcoal may be deposited in a grill for use. In most environmental conditions, the charcoal will be ready in about 10 to 20 minutes. Consequently, there is room for improvement in this field to reduce the time required to prepare the charcoal for the grill.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In one aspect of the invention, an improved chimney starter is provided, the improved chimney starter comprising a cylindrical housing having an outer wall and inner wall defining a chamber, the chamber configured to hold charcoal; a series of spiral heat exchange chambers contained within the cylindrical housing; a top rim configured to connect the outer wall to the inner wall and enclose the series of spiral heat exchange chambers; an air intake port provided on a portion of the cylindrical housing, wherein the air intake port is connected to the series of spiral heat exchange chambers; a base configured to retain a fire starter configured to ignite and burn the charcoal; and, a fan blower configured to be positioned in the air intake port such that blown air is configured to be directed through the series of spiral heat exchange chambers, wherein the directed air accelerates the burning of the charcoal.

In one embodiment, the base is removable. In another embodiment, the cylindrical housing includes a plurality of air vents positioned at a bottom portion of the cylindrical housing, and the removable base is configured to seal off the plurality of air vents. In one embodiment; the plurality of air vents is configured to encircle the entirety of the cylindrical housing.

In one embodiment, a number of air flow deflectors on a top surface of the base are provided. In another embodiment, a handle attached to the outer wall of the housing is provided, the handle enabling a user to handle the chimney starter. In one embodiment, the fan blower is wireless. In yet another embodiment, the charcoal is placed on a g inside the cylindrical chamber, wherein the grate is above the base. In one embodiment, the inner wall of the cylindrical housing includes spiral blades configured to assist the directed air around the inner wall of the cylindrical housing chamber from top to bottom. In another embodiment, the directed air is heated via the burning coals, wherein the heated directed air further accelerates the burning of the charcoal.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out his invention, Various modifications, however, will remain readily apparent to those skilled in the art, since the general principles of the present invention have been defined herein to specifically provide an improved chimney starter.

Figure 1:
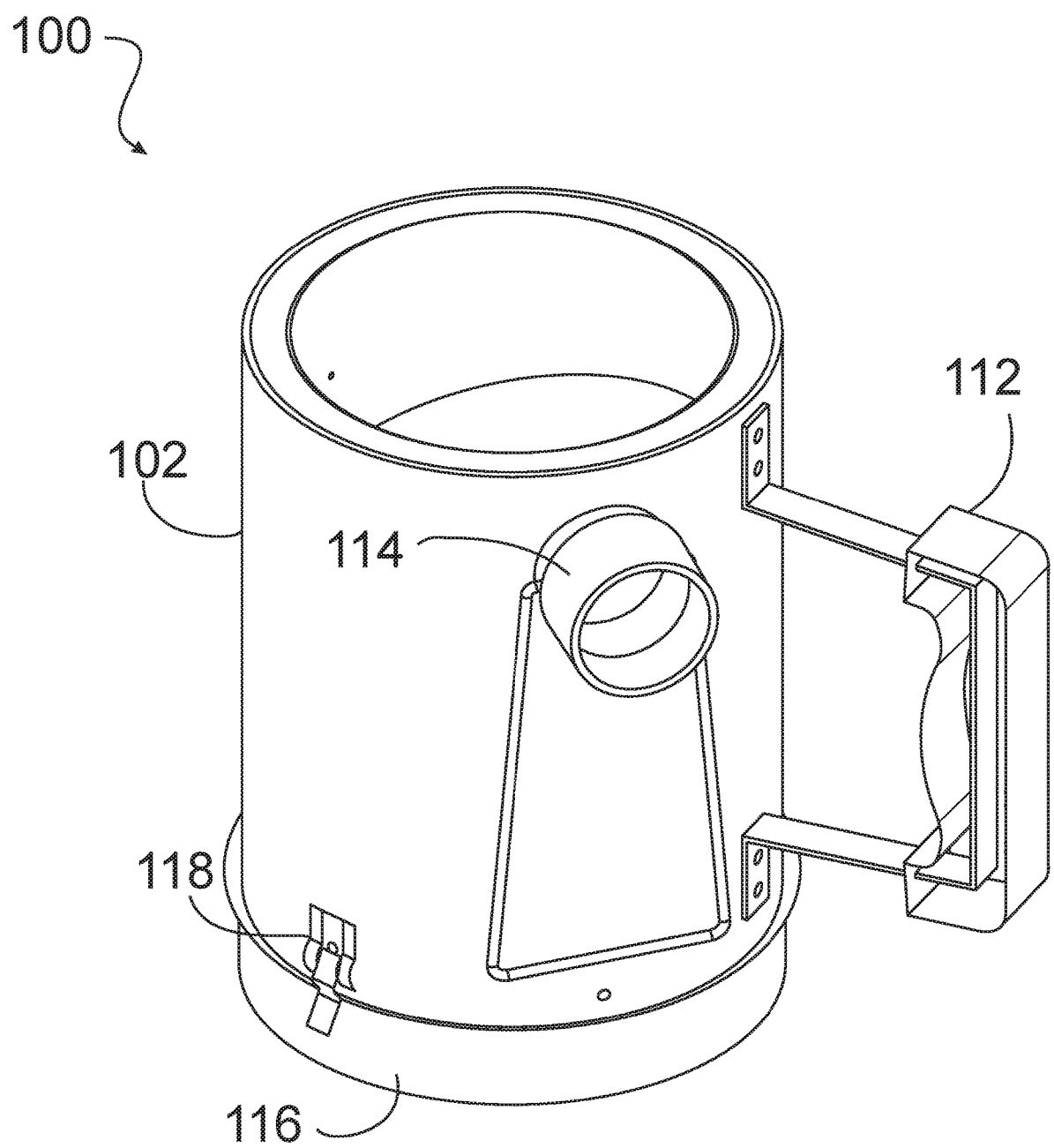
FIG. 1 is a perspective view of the improved chimney starter according to an embodiment of the present invention.
Figure 2:
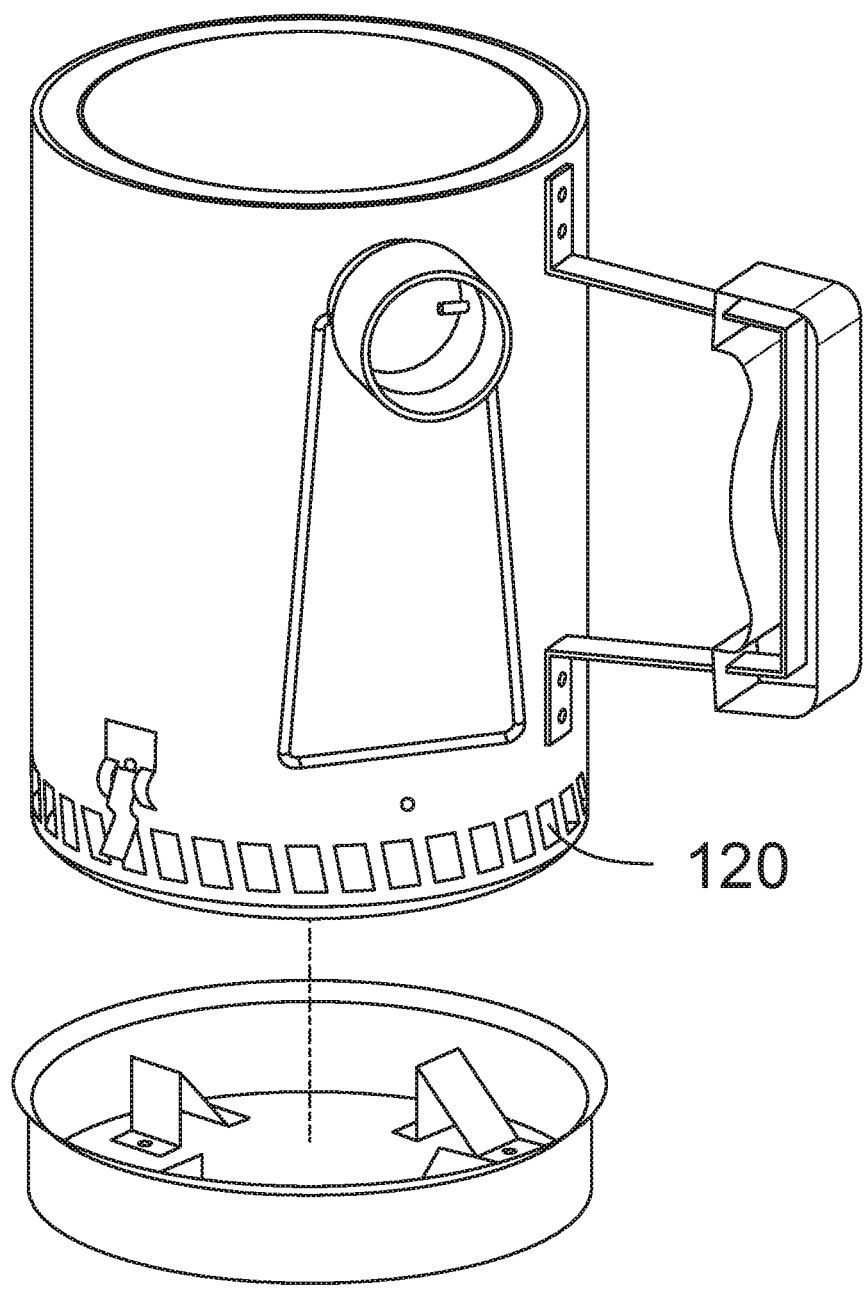
FIG. 2 is a perspective view of the improved chimney starter with the removable base removed from the chimney according to an embodiment of the present invention.
Figure 3:
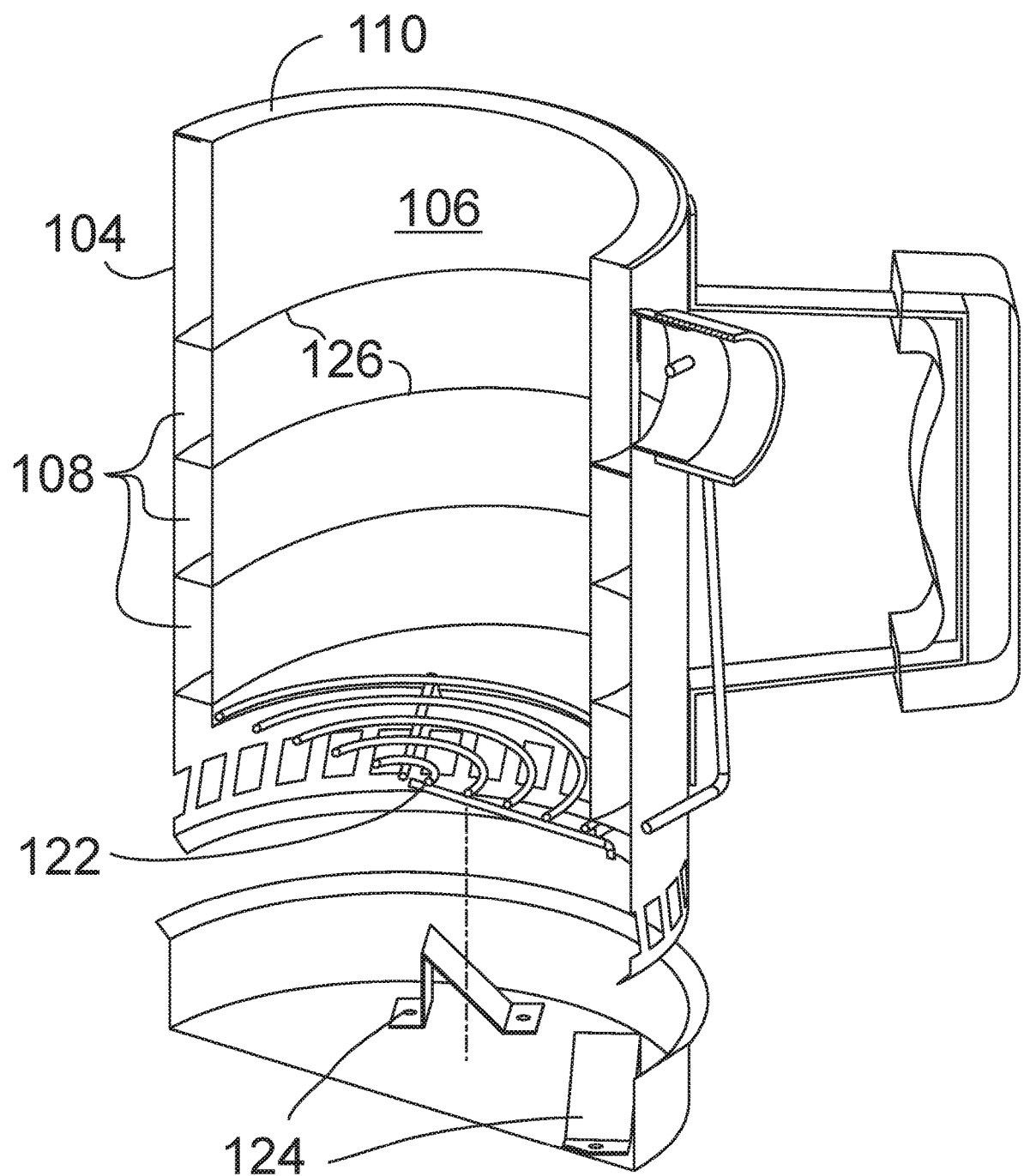
FIG. 3 is a sectional view showing the internal structure of the improved chimney starter according to an embodiment of the present invention.

Referring now to FIGS. 1-3, various views of the improved chimney starter 100 are illustrated. The improved chimney starter 100 comprises a cylindrical housing 102 having an outer wall 104 and inner wall 106 defining a chamber, the cylindrical housing configured to contain a series of spiral heat exchange chambers 108. In one embodiment, a top rim 110 encloses the chambers and connects the outer wall 104 to the inner wall 106. A handle 112 is provided and attached to the outer wall of the housing via any attachment means known in the art. The handle enables a user to handle the chimney in a safe manner as well known in the art.

In one embodiment, an air intake port 114 is provided on a portion of the cylindrical housing, wherein the air intake port is connected to the series of spiral heat exchange chambers. In one embodiment, the portion of the cylindrical housing is a top portion adjacent to the top rim on the outer wall. It should be understood that the location of the air intake port may vary. The use of the air intake port will be discussed in further details below.

In one embodiment, a removable base 116 is removably attached to the cylindrical housing via any removable attachment means 118 known in the art. Best seen in FIG. 2, the removable base is configured to cover a plurality of air vents 120 positioned at a bottom portion of the cylindrical housing. In one embodiment, the plurality of air vents is configured to encircle the entirety of the cylindrical housing. In one embodiment, a number of air flow deflectors 124 are provided on a top surface of the removable base. It should be understood, that in some embodiments, the base is fixed and not removable.

Best seen in FIG. 3, a grate 122 is positioned inside the cylindrical housing toward the bottom portion, above the removable base. The grate is configured to hold charcoal inside the cylindrical housing while also preventing the charcoal from entering the removable base. In one embodiment, the grate is positioned directly above the plurality of air vents.

Figure 4:
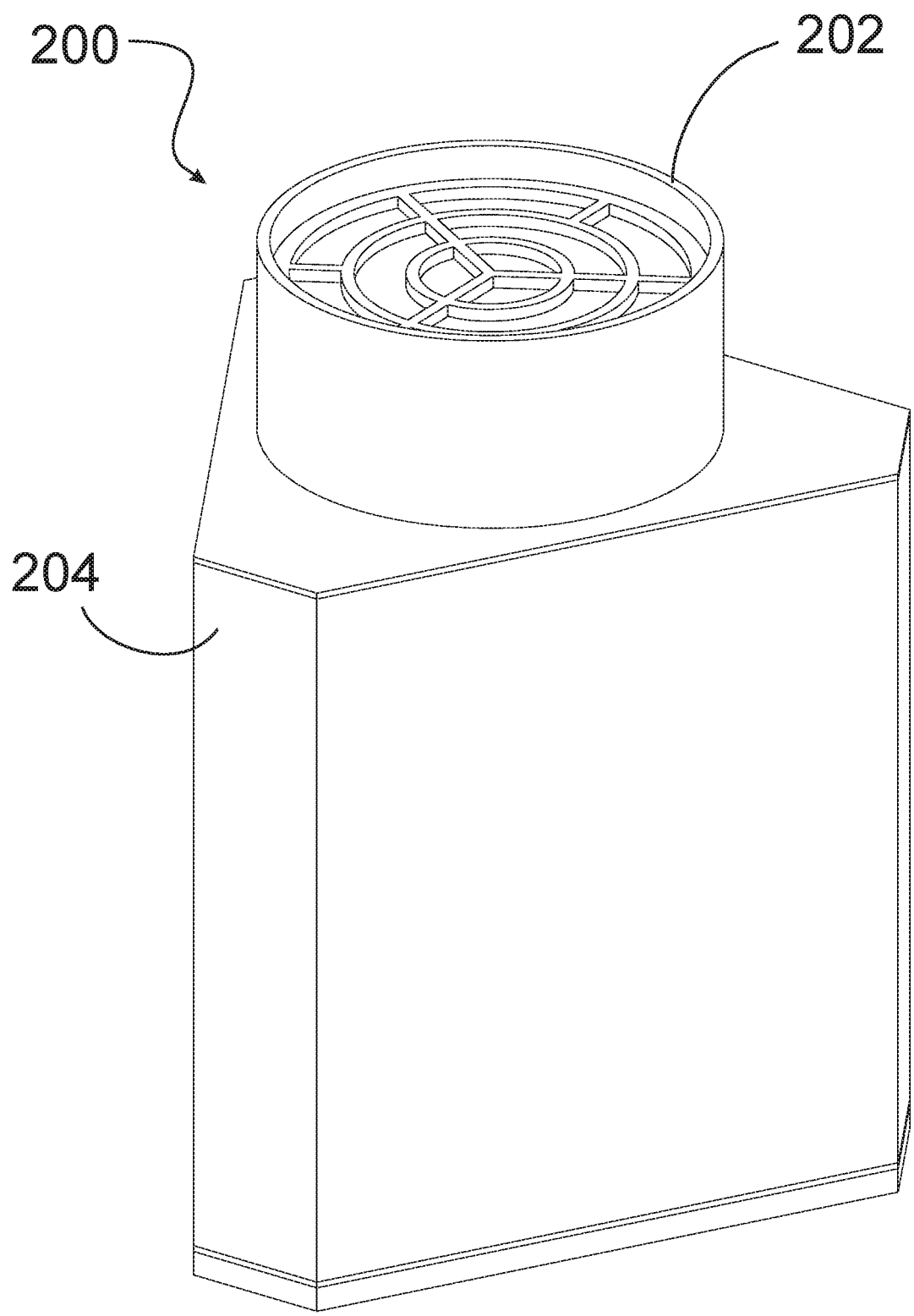
FIG. 4 is a perspective view of the fan blower according to an embodiment of the present invention.
Figure 5:
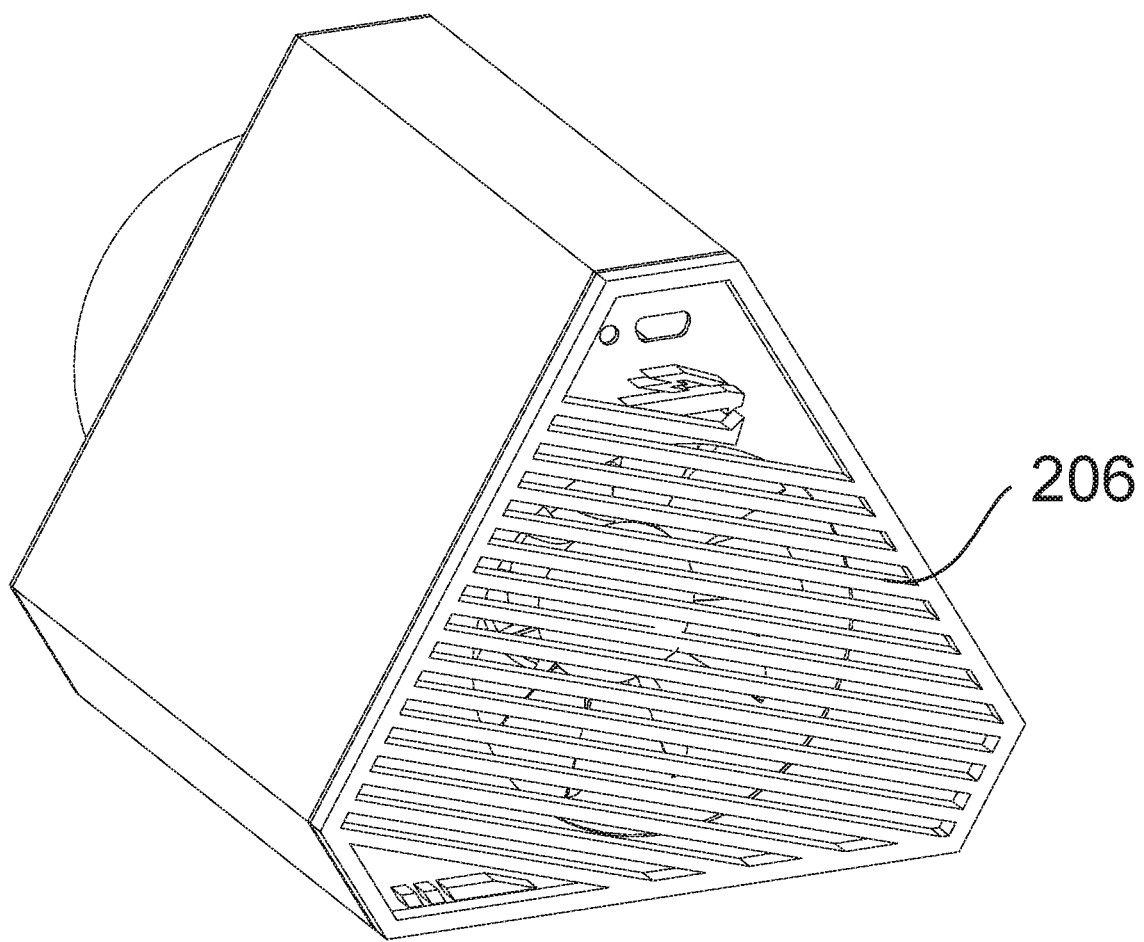
FIG. 5 is an alternative perspective view of the fan blower according to an embodiment of the present invention.
Figure 6:
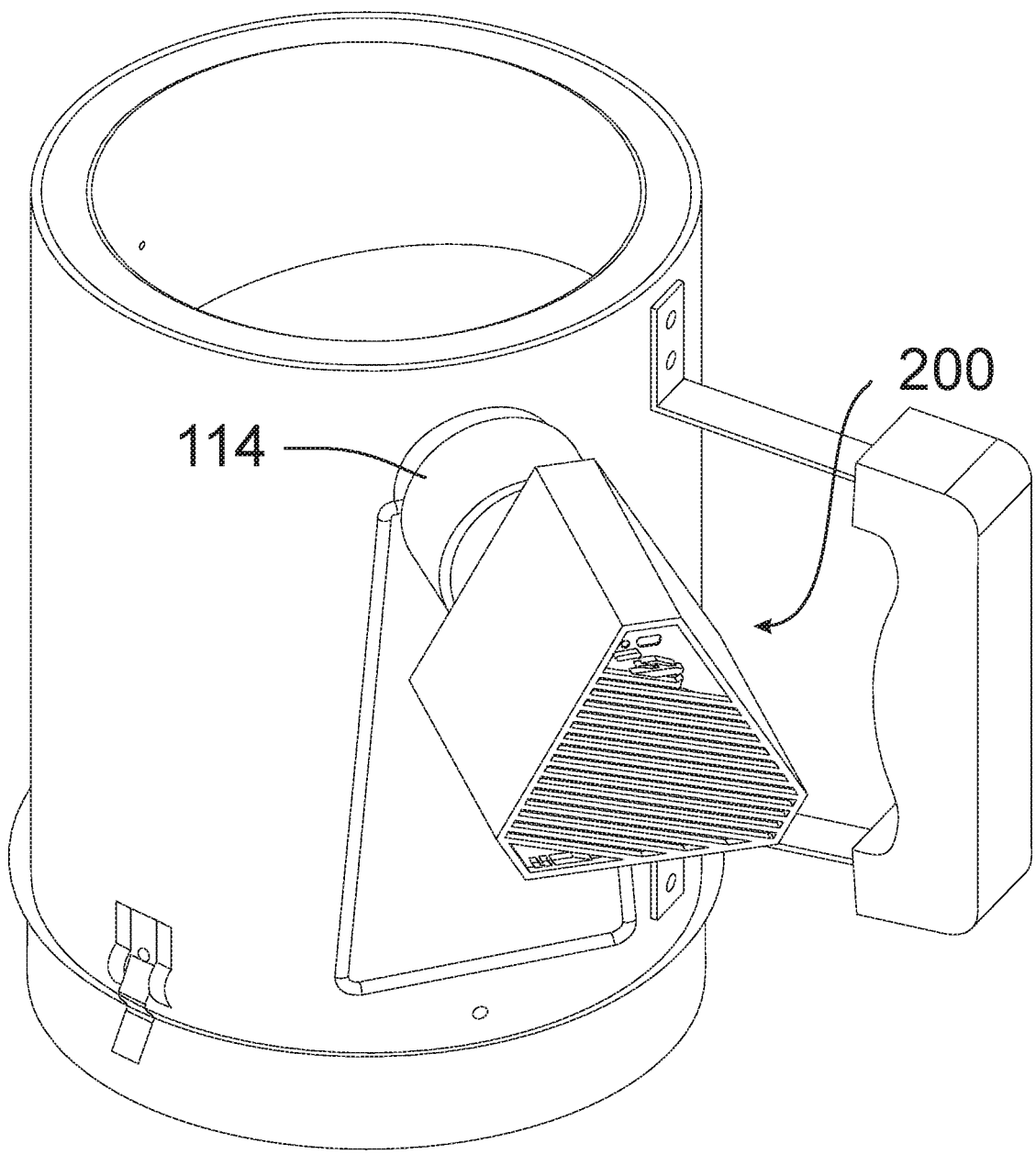
FIG. 6 is the fan blower in use according to an embodiment of the present invention.

Referring now to FIGS. 4-6, a fan blower 200 is illustrated. The fan blower comprises a fan body 204, fan blower 202, and fan intake 206. In one embodiment, the fan blower is triangular having flat corners. It should be understood that the shape and construction of the fan blower may vary without departing from the scope of the invention. For instance, the fan body may be circular, square, triangular with rounded corners, etc. The critical aspect is that the fan blower is configured to be positioned in the air intake port 114 on the cylindrical housing, as seen in FIG. 6. Advantageously, the fan blower is wireless, and is configured to operate via batteries, such as rechargeable or replaceable. In alternative embodiments, the fan blower may include a power cord.

Figure 7:
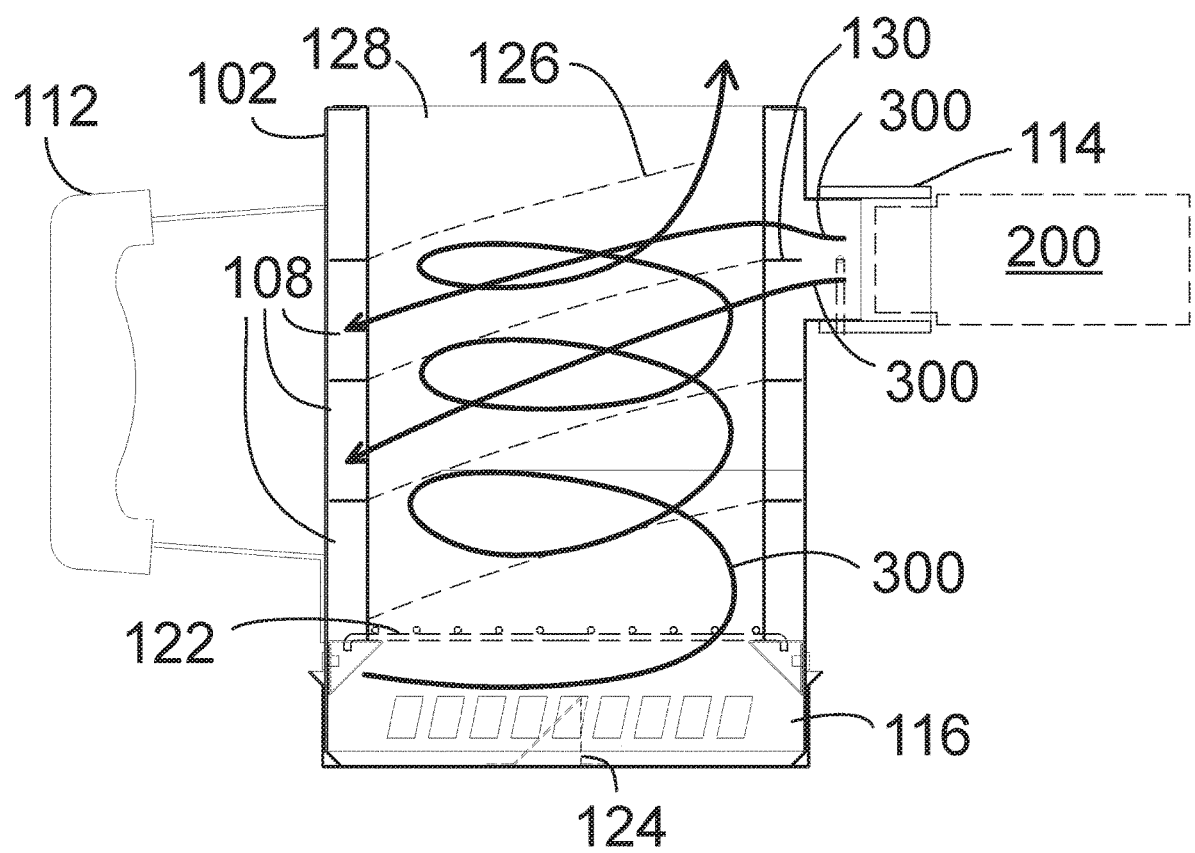
FIG. 7 is a sectional view showing the improved chimney starter in operation according to an embodiment of the present invention.

Referring now to FIG. 7, a sectional view showing the operation of the improved chimney starter is illustrated. During typical operation, a fuel/fire starter source is placed in the removable base 166, and charcoal (not illustrated) is placed on grate 122, inside the chimney. The improved chimney starter is configured to hold a large volume of charcoal. In one embodiment, the cylindrical housing 102 is approximately 12" in height, and has an inner diameter of approximately 7" to 8". It should be understood, that this is merely an example of size and the cylindrical housing size may vary. Next, the fuel fire starter source is ignited which starts to ignite the approximate charcoal, such as the charcoal positioned directly on the grate. Next, the fan blower is turned on, wherein the fan blower directs air 300 through the series of spiral heat exchange chambers 108, down towards the removable base, up through the cylindrical housing, and out the opening 128. The directed air is heated as the charcoal gets ignited and burned, wherein the heated air (oxygenated air) accelerates the combustion of the remaining charcoal. In some embodiments, spiral blades 126 are configured to assist the air 300 and around the inner wall of the cylindrical housing chamber from top to bottom and/or bottom to top. As illustrated, during operation all the charcoals are ready to be transferred to the grill in under three minutes. This is much faster than the chime starters of the prior art. The charcoal is ready when ignited is relatively covered with gray ash as well known in the art.

In some embodiments, the air flow deflectors 124 help direct air throughout the cylindrical housing chamber. In one embodiment, the air intake port 114 is heat resistant to prevent the fan blower from overheating during operation. In one embodiment, one or more airflow splitters 130 are positioned in the air intake port 114 to split the directed 300 into multiple streams. The heat exchange chambers help keep the outer wall of the cylindrical housing cool to prevent injuries, although the handle should be used to handle the chimney at all times. The directed airflow also helps the charcoal burn evenly and clean compared to chimney starters of the prior art.

During operation, it is critical that the plurality of air vents 120 are sealed via the removable base 116 and 100% of the air intake is via the fan blower 200. It should be understood, that multiple arrangements of components may vary or their positions may vary. For instance, the spiral blades 126 may not be provided, although they aid in providing a more efficient operation.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

In addition, reference to "first," "second," "third," and etc. members throughout the disclosure (and in particular, claims) are not used to show a serial or numerical limitation but instead are used to distinguish or identify the various members of the group.

What is claimed is:
1. An improved chimney starter comprising:
a cylindrical housing having an outer wall and inner wall defining a chamber, the chamber configured to hold charcoal;
a series of spiral heat exchange chambers contained within the cylindrical housing; a top rim configured to connect the outer wall to the inner wall and enclose the series of spiral heat exchange chambers;
an air intake port provided on a top portion of the cylindrical housing, wherein the air intake port is connected to the series of spiral heat exchange chambers;
a base configured to retain a fire starter configured to ignite and burn the charcoal;
a fan blower configured to be positioned in the air intake port such that blown air is configured to be directed through the series of spiral heat exchange chambers, wherein the directed air accelerates the burning of the charcoal;

an airflow splitter positioned within the air intake port configured to split the directed air into multiple streams through at least two different spiral heat exchanger chambers of the series of spiral heat exchange chambers helping the charcoal to burn evenly; and, wherein the inner wall of the cylindrical housing includes spiral blades configured to assist the directed air around the inner wall of the cylindrical housing chamber from top to bottom.

2. The improved chimney starter of claim 1, wherein the base is removable.

3. The improved chimney starter of claim 2, wherein the cylindrical housing includes a plurality of air vents positioned at a bottom portion of the cylindrical housing, and the removable base is configured to seal off the plurality of air vents.

4. The improved chimney starter of claim 3, wherein the plurality of air vents is configured to encircle the entirety of the cylindrical housing.

5. The improved chimney starter of claim 1, further comprising a number of air flow deflectors on a top surface of the base.

6. The improved chimney starter of claim 1, further comprising a handle attached to the outer wall of the housing, the handle enabling a user to handle the chimney starter.

7. The improved chimney starter of claim 1, wherein the fan blower is wireless.

8. The improved chimney starter of claim 1, wherein the charcoal is placed on a grate inside the cylindrical chamber, wherein the grate is above the base.

\* \* \* \* \*